FUEL COMPOSITIONS

Original Filed Jan. 10, 1966

Inventors
John W. Schick
John H. Stockinger
By
Benjamin I. Yaufman
Attorney

United States Patent Office

Re. 27,262
Reissued Dec. 28, 1971

27,262

FUEL COMPOSITIONS

John W. Schick and John H. Stockinger, Cherry Hill, N.J., assignors to Mobil Oil Corporation Original No. 3,402,031, dated Sept. 17, 1968, Ser. No. 628,786, Apr. 5, 1967, which is a continuation-in-part of abandoned Ser. No. 508,829, Nov. 19, 1965, and a continuation of Ser. No. 519,798, Jan. 10, 1966. Application for reissue Sept. 22, 1969, Ser. No. 862,996
Int. Cl. C10l 5/36
U.S. Cl. 44—14 7 Claims

Matter enclosed in heavy brackets [ ] appears in the original patent but forms no part of this reissue specification; matter printed in italics indicates the additions made by reissue.

ABSTRACT OF THE DISCLOSURE

A fuel composition is provided comprising a combustible wrapper containing a plurality of [nonseparable adjoining] *adjacent closely associated fuel* sections *having interfacing surfaces at least slightly spaced,* each section comprising a mixture of petroleum coke, wood-sawdust, charcoal, an oxidizing agent capable of supporting combustion and a [heat-sensitive] binder *for adhering the particles of said fuel sections during combustion as a self supporting free-standing unitary structure,* wherein the interface areas between these sections have relatively lower densities than the remaining areas of the sections.

Figure 1:
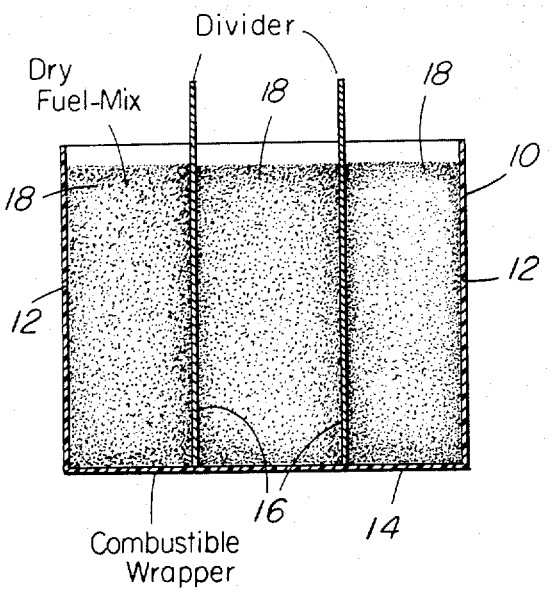

This application is a continuation-in-part of our prior and copending application, Ser. No. 508,829, filed on Nov. 19, 1965, and a continuation of our application Ser. No. 519,798, filed Jan. 10, 1966, both now abandoned, and relates to fuel compositions, and, more particularly, to artificial carbonaceous fuel compositions having improved burning properties and to the method for their preparation. Still more particularly, the invention herein relates to artificial carbonaceous fuel compositions, in the form of briquettes having improved burning properties, the method for their preparation, and having particular utility when employed for purposes of orchard heating.

Heretofore, a serious problem has been encountered in combating low-temperature and frost conditions seasonally encountered in orchards and other outdoor vegetation and in crop areas, which cause destruction or heavy damage to fruit, branches, limbs and, in many instances, to vines and trees themselves. To offset these injurious effects of periodic low-temperature climatic conditions, it is essential that there be provided a source of heat and means for carrying such heat to the vines, trees and other vegetation. For this purpose, heat has heretofore been supplied by various means, ranging from conventional gas and fuel-oil burning frost-pot and return-stack heaters to smudging and the burning of scrap rubber, and in which heat is carried to the vegetation by convection currents, or, in more sophisticated installations, by wind-machines designed to induce such currents. In this respect, however, the use of such devices has resulted in the accompanying dissipation of large quantities of smoke, causing the deposition of soot or smudge upon the fruit or vegetation. Furthermore, the presence of an open flame in close proximity to the fruit, vines, trees or other vegetation may also result in their damage or even in their destruction. Also, prior to the present invention, the burning of artificial solid carbonaceous fuels in the form of small lumps or briquettes in specially designed heaters, has been resorted to; however, in these instances, a smokeless type of fuel briquette is not available. Furthermore, apart from the undesirable deposition of soot resulting from the burning of the briquette, the presence of an open flame is still another factor which heretofore has rendered the use of carbonaceous briquettes, as a source of heat, unattractive for the aforementioned purpose.

The ability to employ a substantially smokeless fuel composition, for example in the form of a briquette, which it capable of burning without the presence of any substantial flame, would, therefore, be highly desirable. The use of equipment such as the aforementioned frost-pots, return-stack heaters, wind-machines, etc., would be completely eliminated, with its attendant saving in cost. In addition, the ability of the fuel composition to burn without the presence of a flame would permit placing it in close proximity to the trees, vines or other forms of vegetation, and would thus avoid expensive waste of heat values, which is presently encountered when the heat source must be placed at a considerable distance from the desired point of application.

Prior to the present invention, charcoal briquettes or lumps for heating purposes, have generally been fabricated from mixture containing major amounts of charcoal and minor amounts of filler materials such as sawdust, wood shavings, or excelsior, and various forms of binding agents. Such mixtures are usually compressed under relatively high pressure into the briquette or lump form, and are subsequently coated by immersion or spraying with a water-proofing agent, such as varnish, paraffin, or a resinous or plastic material. Various formulary modifications have also been suggested, including improvements relating to the filler, binder and water-proofing components. In all such formulations, it is found, however, that certain highly undesirable disadvantages are inevitably present. Of particular significance is the fact that the conventional briquette or lump-form composition cannot be burned without the release of smoke or the presence of an open flame, as hereinbefore described. Apart from these disadvantages, the ability of the briquette to release its heat at a controlled rate, is highly desirable from both a practical and economic standpoint. In this respect, the conventional form of briquette is also deficient.

In application Ser. No. 401,665, filed Oct. 5, 1964, now abandoned there were disclosed new and improved substantially smokeless and flameless solid fuel compositions, preferable in the form of briquettes, which are manufactured, in general, by first forming a mixture comprising petroleum coke, wood-sawdust and charcoal components; forming another mixture comprising an aqueous solution of an oxidizing agent and a binder; combining these mixtures to form a slurry; and then subjecting this slurry to an extrusion operation to obtain a briquette of the desired configuration. Subsequently the briquette thus produced is then passed into a heater or other device, in which water is removed at elevated temperatures.

It will be apparent, even from the above-described

ıethod of improved briquette manufacture, that the ıolding operation, although a necessary step for briuette formation, represents, nevertheless, an additional gnificant manufacturing cost. If such operation could e eliminated, and yet result in obtaining a self supportıg, free-standing briquette, obvious economic advantages ould be realized. To achieve such objectives, there is rovided in application Ser. No. 463,031, filed June 10, 965, *now abandoned* new and improved substantially nokeless and flameless solid fuel compositions which, ı general, are prepared by forming a mixture comprisıg, by weight, a major proportion of petroleum coke and ıinor proportions of wood-sawdust, charcoal, an oxidizıg agent capable of supporting combustion and a heatensitive binder; enclosing this mixture in a combustible rapper, and igniting this wrapper, whereby the heat of ombustion causes the binder to set the aforementioned omponents of the mixture and to form a self-supportıg, free standing fuel composition, which will continue burn for relatively long periods of time, in the form f a glow, but without the presence of any substantial noke or flame. In their preferred form, these fuel comositions are preferably employed as briquettes or lumps, ossessing the aforementioned significantly improved roperties and making them particularly suitable for outoor-heating purposes, for the protection of various orms of vegetation, in which the briquette is able to rease its heat at a controlled rate.

It has now been found, however, that the burning rate f fuel compositions prepared in this manner, are subct to all of the physical laws of density and that a solid uel package prepared from such fuels can be modified to rovide either rapid or slow heat evolution. In this repect it has also been found that when the density of the uel package is lower than about 40 pounds per cubic oot, the fuel package becomes structurally unstable, thus efeating the aforementioned desired free-standing selfupporting characteristic. On the other hand, although ructural stability can be achieved by increasing the ensity of the fuel package, a relatively slower burning ate is encountered. In this respect, in order for the aforeentioned fuel package to constitute an effective orchard eating source, it is found that from about 80 to about 0 percent of the available heat values should be emitted ithin a period of from about 4 to about 5 hours after nition; however, this rate of emission has been found be achieved only at densities which are below about 0 pounds per cubic foot.

It is, therefore, an object of the present invention to rovide an improved substantially smokeless and flamess solid fuel composition.

Another object of the invention is to provide a subantially smokeless and flameless improved artificial caronaceous fuel composition, preferably in the form of a riquette, wherein such briquettes can be fabricated from mixture of components which necessitate no expensive anipulative molding operation, to form a self-supportıg free-standing solid fuel, and which can be consumed t a relatively rapid rate while still maintaining full ructural strength.

Still another object of the invention is to provide a new nd improved method for the manufacture of solid fuel ompositions having the aforementioned desirable charcteristics.

Other objects and advantages inherent in the invention ill become apparent to those skilled in the art from e following more detailed description.

Of particular importance in the fuel compositions of e present invention is the petroleum coke component. etroleum coke, being a refractory carbonaceous residue aterial has not heretofore been considered as having y significant fuel value, from a practical commercial andpoint, because of its characteristic lack of being sily ignitable and its inability to readily support comustion. Thus, petroleum coke, which is generally obtained in the form of either a delayed coke or fluid coke, possesses a low volatility content and is ignitable only at temperatures as high as from about 2500° F. to about 2700° F. Delayed coke, varying in physical properties from finely divided particles to relatively coarser and larger particles is more volatile and less carbonaceous than fluid coke, and is ignitable at a somewhat lower temperature within the aforementioned range, than fluid coke. In this respect, it is found that if petroleum coke can be successfully ignited to a temperature where it can support combustion, it is able to burn in a state of glow, without the emission of substantial quantities of smoke or the presence of an open flame, and at a controlled rate, making possible the realization of the previously discussed advantages.

In order to attain the aforementioned relatively high temperatures required for initially igniting the petroleum coke and for subsequent self-burning sustained combustion thereof, the solid fuel compositions of the present invention are also comprised of minor proportions of charcoal and wood-sawdust, in combination, as a filler material. In this respect, ignition of the charcoal component results in the combustion thereof at a sufficiently high temperature which is effective for the subsequent ignition and the support of combustion of the petroleum coke. The presence of the wood-sawdust component in the filler material makes possible a combustion mechanism in which the sawdust, being the most easily combustible component present, is most readily ignitable, gives off sufficient heat upon being combusted to ignite the charcoal component, and the latter, upon being ignited and combusted, in turn gives off heat at a relatively increased temperature, which is sufficient for the purpose of igniting and initiating sustained combustion of the petroleum coke.

In order to initiate the combustion of the wood-sawdust component in the above-described filler material, the aforementioned oxidizing agent, capable of supporting combustion, is incorporated as a component of the solid fuel composition. The concentration of this oxidizing agent in the solid fuel composition above the minimum level required to support combustion of the petroleum coke, can be varied to any desired burning rate. Various types of oxidizing agents may be employed for this purpose, and particularly preferred are the nitrates, chlorates, perchlorates, peroxides and permanganates, although any type of oxidizing agent which is capable of supporting combustion can be successfully employed for this purpose. It will be apparent, of course, that in a given instance each oxidizing agent would be employed in different amounts in order to obtain a desired burning rate for the fuel composition. In essence, therefore, this ability of being able to effect ultimate combustion of the petroleum coke in a sustained manner and at a controllable burning rate, makes possible the production of a solid fuel composition which can burn without the presence of any substantial smoke or open flame, and having all of the obvious attendant advantages, described above.

For purposes of consolidating and obtaining a self-supporting free-standing, shaped solid fuel (as, for example, in the form of a briquette or other desired configuration), a minor proportion of a heat-sensitive binder, which sets or gels, when subjected to elevated temperature, is employed. This heat-sensitive, thermosetting or thermogelling binder may comprise such materials as a sugar; molasses; phenolic resins, such as phenol-formaldehyde, urea-formaldehyde; epoxy resins; polyesters; polycarbonates, polyamides and similar materials. The use of such heat-sensitive binder, is of particular significance. Prior to the present invention, as previously indicated, in order to obtain a free-standing briquette containing the aforementioned components, viz, petroleum coke, charcoal, wood-sawdust, oxidizing agent, and a suitable water-soluble binder, such as starch, relatively large quantities of water, e.g., from about 25 to about 35 percent, by weight, were required to be added, in order to plasticize the dry-mix composition, and thus render it suitable for pressing or extrusion, to obtain the desired solid fuel configuration. Following such operation, dehydration of the thus-formed solid fuel had to be resorted to under carefully controlled conditions of air velocity, humidity, and temperature, in order to prevent undesirable migration of the oxidizing agent to the surface of the molded fuel composition, which resulted in undesirable flaring, flaming and poor burning rate, which, in turn, would not make such fuel compositions suitable for their intended purpose, viz, outdoor heating for vegetation. On the other hand, by employing the aforementioned heat-sensitive binder, in place of those heretofore used, and forming a self-supporting, free-standing composition, without the application of heat, no substantial quantities of water are required to be present for carrying out the shaping or molding operation, other than a relatively small amount of water for distributing the binder material and to impart sufficient equilibrium moisture content. In such procedure, therefore, no migration of the oxidizing agent to the surface of the solid fuel can occur, with the aforementioned attendant disadvantages.

As previously indicated, the aforementioned mixture comprising petroleum coke, wood-sawdust, charcoal, oxidizing agent and binder are enclosed in a combustible, readily ignitable wrapper. This combustible wrapper may be comprised of any flammable material such as paper, corrugated board, plastic materials, plastic laminated paper, oxidizing salts impregnated on paper, and similar materials. In addition, the combustible wrapper may also be made waterproof by being coated or impregnated with suitable waterproofing materials, for example, wax-coated or impregnated corrugated board or paper, or paper or corrugated board coated or impregnated with both wax, plastic material and the above-described readily ignitable oxidizing agent.

As hereinbefore described, the fuel compositions of the present invention comprise a major proportion of petroleum coke and minor proportions of wood-sawdust, charcoal, oxidizing agent and heat-sensitive binder, which are enclosed in a combustible wrapper. From a practical standpoint, these fuel compositions comprise, by weight, from about 50 to about 90 percent, and preferably, from about 60 to about 80 percent petroleum coke; from about 3 to about 20 percent, and, preferably, from about 5 to about 15 percent wood-sawdust; from about 4 to about 40 percent, and, preferably, from about 7 to about 20 percent charcoal; from about 2 to about 15 percent, and, preferably, from about 5 to about 10 percent oxidizing agent; and from about 1 to about 10 percent, and, preferably, from about 3 to about 5 percent binder.

As previously described, each of the aforementioned sections of the novel fuel composition is comprised of the above-described combustible mixtures. For this purpose, each section may comprise identical fuel mixtures, containing identical components and being present in identical proportion; or each section may comprise a different fuel mixture, each fuel mixture containing different components and being present in different proportions, but each of these components being selected from the general basic types of materials described above and within the above-described range of proportions.

The preparation of the novel fuel compositions of the present invention [is] *may be* carried out by placing a plurality of the aforementioned fuel mixtures within the combustible wrapper in increments, to form a plurality of [adjoining] *adjacent* sections, wherein the interface areas between these sections are of relatively lower densities than the [remaining areas] *fuel* of the section. To achieve this difference in densities at the interfaces of the adjoining sections, a plurality of dividers may be positioned at selected points to form a series of enclosed compartments within the combustible wrapper or container. After the individual fuel mixtures have been poured into the respective compartments, the dividers may be removed, resulting in a plurality of relatively low-density interfaces between mixtures. The dividers used for this purpose may comprise any material, e.g., metal plates, plastics, wood, cardboard, paper and the like. However, if, as previously indicated, an even greater degree of fuel burning rate is desired, combustible dividers (e.g., cardboard, paper, wood, plastics and the like) can be employed as additional density modifiers, but which are not withdrawn from the wrapper or container, and remain in this position during combustion of the fuel composition.

The accompanying drawing will serve to illustrate one embodiment of the novel fuel compositions of the present invention, with respect to their structure, their method of preparation and their behavior during combustion, in which an increased and controlled burning rate is realized.

Figure 2:
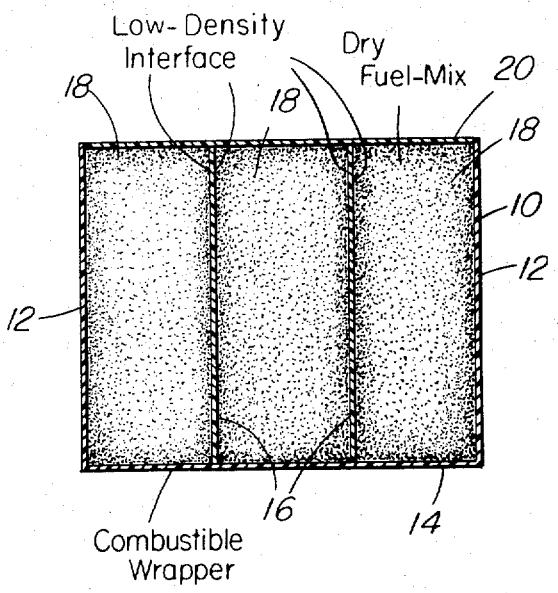

Referring to the drawing, there is provided, as shown in FIGS. 1 and 2, a combustible wrapper or container 10, having side-wall members 12, and a bottom or base member 14. A plurality of dividers 16 is positioned within wrapper or container 10, to form a series of completely enclosed compartments, open only at the top, into which the aforementioned fuel mixtures (dry fuel-mix) 18 are poured into respective compartments or sections. After each compartment has been filled to the top level of container 10 with the respective fuel mixtures 18, dividers 16 may be removed; or (when combustible dividers are provided, as previously indicated), may be left in position as shown in FIG. 2. In either instance, relatively low-density areas will be provided at the interfaces of respective fuel mixtures 18. After the respective compartments have been filled with the fuel mixtures 18, and the respective dividers 16 have been withdrawn, or left in position as shown in FIG. 2, the open top of container 10 is preferably enclosed with a combustible covering member 20, as shown in FIG. 2.

Figure 3:
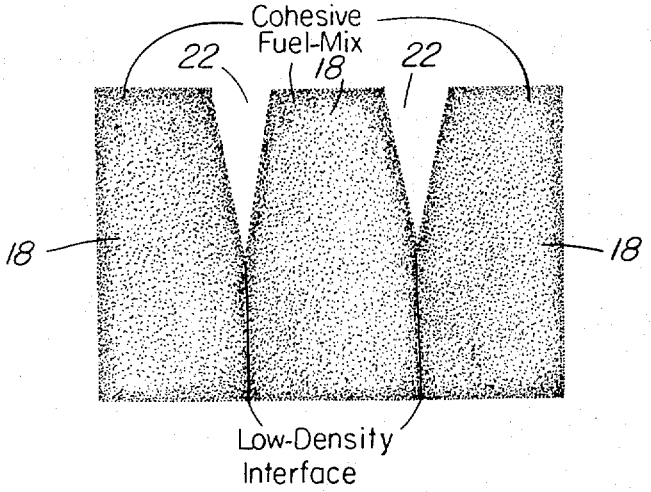

Following ignition and combustion of outer wrapper or container 10, the heat of combustion causes the binder in mixture 18 to set the remaining components, to form a self-supporting, free-standing fuel composition, comprising a cohesive fuel-mix, as shown in FIG. 3, which will continue to burn for the desired period of time in the form of a glow, but without the presence of substantial quantities of smoke or flame, as previously indicated. As is shown in FIG. 3, inasmuch as the interface areas between the plurality of sections containing mixtures 18 have relatively lower densities than the remaining areas of their respective sections, fuel consumption at the interface occurs at a relatively faster rate than within the remainder of fuel mixtures 18. Cracks 22 develop at the interface areas between mixtures 18, and provide radiating surfaces, at which point the burning rate is markedly increased. As previously indicated, positioning of combustible dividers within the interface areas between pairs of sections comprising mixtures 18, function as further density modifiers and provide an even greater degree of increased fuel burning rate.

The following examples will serve to illustrate the improved characteristics of the novel fuel compositions of the present invention, in the preferred form of briquettes, and to illustrate not only their relatively long burning, substantially smokeless and flameless combustion properties, but also the improved burning rate than can be achieved by employing the above-described relatively low-density interface areas between briquette sections comprising the novel fuel compositions.

In accordance with Examples 1 through 5 of the following table, dry fuel compositions were prepared, in which the containers of Examples 1, 2, 3 and 4 had dimensions of 5½" x 5½" x 5½", while the container of Example 5 had the dimensions of 6½" x 6½" x 4", thus having a slightly greater volume. Each container was fabricated from one-sided corrugated paper-board, and each container was coated with 25 grams of paraffin wax to facilitate ignition of the novel fuel briquette package.

'he combustible briquette fuel mixtures placed in each f the containers of Examples 1 through 5 comprised, by 'eight, approximately 66 percent petroleum coke, 6 per-ent charcoal, 6 percent wood-sawdust, 12 percent sodium itrate, and 10 percent molasses (containing 50 percent 'ater), and each briquette was packed to a density of 45 ounds per cubic foot.

The container of the fuel briquette composition of 'xample 1 was packed with the aforementioned combus-ble fuel mixture employing no dividers, and therefore epresented a solid dry fuel-mix, having no interfaces of iffering densities. The container of the fuel briquette of 'xample 2 was fabricated employing dividers (subse-uently removed) to form the three-sectional block (as hown in FIG. 1), to provide low-density interfaces. The ontainer of the fuel briquette of Example 3 was packed ı a manner similar to that of Example 2, except that aper dividers were employed and were not removed as shown in FIG. 2). The container of the fuel briquette f Example 4 was packed in a manner similar to that of 'xample 3, except that paper dividers were employed that ielded 4 wedge shaped sections and were not removed. 'he container of the fuel briquette of Example 5 was repared in a manner identical to that of the fuel briquette f Example 4, except, as previously indicated, the con-ıiner of the briquette of Example 5 had slightly larger imensions.

TABLE

| xample | Percent fuel consumed in 4 hours | Description |
|---|---|---|
| ..... | 55 | Solid fuel block (5½" x 5½" x 5½") (no low density interfaces). |
| ..... | 64 | Three-sectional block (5½" x 5½" x 5½"). |
| ..... | 70 | Three-sectional block (5½" x 5½" x 5½") (with paper dividers). |
| ..... | 78 | Four-sectional block (5½" x 5½" x 5½") (with paper dividers). |
| ..... | 62 | Four-sectional lock (6½" x 6½" x 4") (with paper dividers). |

As will be seen from the data of the foregoing table, n increased burning rate is achieved with fuel composi-ons having relatively low-density interfaces. Thus, it 'ill be noted that the briquette of Example 1, having no ɔw-density interfaces, was 55 percent consumed during period of 4 hours. The briquette of Example 2 had two ıterfaces and was 64 percent consumed during this ame period. As shown by Example 3, the insertion of aper dividers (which were not removed), increased the urning rate during this period to 70 percent. Employing paper divider which provided four wedge-shaped pieces which were not removed), further increased the fuel onsumption to 78 percent during this period, as shown y Example 4. As shown in Example 5, employing a riquette having slightly larger dimensions (but similar ı all other respects to the briquette of Example 4) re-ılted in 62 percent fuel consumption as compared with fuel consumption of 78 percent for the only slightly naller briquette of Example 4.

*It will be seen that the inventive concept herein dis-'osed includes fuel compositions of the above described ıgredients which contain a plurality of fuel sections of arying sizes and shapes and which may be prepared by arious manufacturing processes such as extrusion, etc., ɔ long as said fuel sections are adjacent to one another, re closely associated, and present the requisite interface reas to provide radiating surfaces.*

While preferred embodiments of the novel smokeless nd flameless fuel compositions of the present invention, nd the method for their preparation, have been described ɔr purposes of illustration, it will be understood that arious modifications and adaptations thereof, which will e obvious to those skilled in the art, may be made with-ut departing from the spirit of the invention.

We claim:

[1. A fuel composition comprising a combustible wrapper containing a plurality of nonseparable adjoining sections, each of said sections comprising, by weight: a major proportion of petroleum coke; from about 3 to about 20 percent wood-sawdust; from about 4 to about 40 percent charcoal; from about 2 to about 15 percent of an oxidizing agent capable of supporting combustion; and from about 1 to about 10 percent of a heat-sensitive binder selected from the group consisting of sugar, molasses, epoxyresins, polyesters, polycarbonates, polyamides and phenolic resins and wherein the interface areas between said sections have relatively lower densities than the remaining areas of said sections.]

2. The fuel composition of claim 7, wherein said sections comprise, by weight: from about 50 to about 90 percent petroleum coke; from about 3 to about 20 percent wood-sawdust; from about 4 to about 40 percent charcoal; from about 2 to about 15 percent of said oxidizing agent; and from about 1 to about 10 percent of said [heat-sensitive] binder.

3. The fuel composition of claim 7, wherein said sections comprise, by weight: from about 50 to about 90 percent petroleum coke; from about 3 to about 20 percent wood-sawdust; from about 4 to about 40 percent charcoal; from about 2 to about 15 percent sodium nitrate; and from about 1 to about 10 percent of said [heat-sensitive] binder.

4. The fuel composition of claim 7, wherein said sections comprise, by weight: from about 60 to about 80 percent petroleum coke; from about 5 to about 15 percent wood-sawdust; from about 7 to about 20 percent charcoal; from about 5 to about 10 percent of said oxidizing agent; and from about 3 to about 5 percent of said [heat-sensitive] binder.

5. The fuel composition of claim 7, wherein said sections comprise, by weight: from about 60 to about 80 percent petroleum coke; from about 5 to about 15 percent wood-sawdust; from about 7 to about 20 percent charcoal; from about 5 to about 10 percent sodium nitrate; and from about 3 to about 5 percent of said [heat-sensitive] binder.

6. The fuel composition of claim 7, wherein a combustible divider is positioned within the interface area of at least one pair of said sections.

*7. A fuel composition comprising a combustible wrapper containing a plurality of adjacent, closely associated fuel sections having interfacing surfaces at least slightly spaced, each of said fuel sections comprising, by weight: a major proportion of petroleum coke; from about 3 to about 20 percent wood-sawdust; from about 4 to about 40 percent charcoal; from about 2 to about 15 percent of an oxidizing agent capable of supporting combustion; and from about 1 to about 10 percent of a heat-sensitive binder for adhering the particles of each of said fuel sections during combustion as a self-supporting free-standing unitary structure selected from the group consisting of sugar, molasses, epoxyresins, polyesters, polycarbonates, polyamides and phenolic resins and wherein the interface areas between said sections have relatively lower densities than said section.*

*8. A fuel composition comprising a mass of combustible material arranged and disposed to form interfacing surfaces with a material of relatively lower density positioned therebetween and means to prevent separation of said mass, said combustible material comprising by weight: a major proportion of petroleum coke; from about 3 to about 20 percent wood-sawdust; from about 4 to about 40 percent charcoal; from about 2 to about 15 percent of an oxidizing agent capable of supporting combustion; and from about 1 to about 10 percent of a heat-sensitive binder for adhering the particles of each of said fuel sections during combustion as a self-supporting free-standing unitary structure, said binder being selected from the group consisting of sugar, molasses, epoxyresins,*

*polyesters, polycarbonates, polyamides and phenolic resins.*

References Cited

The following references, cited by the Examiner, are of record in the patented file of the patent or the original patent.

UNITED STATES PATENTS

| | | | |
|---|---|---|---|
| 220,484 | 10/1879 | Malone | 44—17 |
| 1,084,369 | 1/1914 | Smith | 44—40 |
| 1,124,015 | 1/1915 | Griffin | 44—40 |
| 1,189,089 | 6/1916 | Geissler | 44—14 |
| 1,990,948 | 2/1935 | Loghray | 44—20 |

| | | | |
|---|---|---|---|
| 2,212,157 | 8/1940 | Fernholtz | 44—38 |
| 2,531,828 | 11/1950 | Schultz | 44—41 X |

FOREIGN PATENTS

| | | |
|---|---|---|
| 949,636 | 2/1964 | Great Britain. |

D. E. WYMAN, Primary Examiner

C. F. DEES, Assistant Examiner

U.S. Cl. X.R.

44—17